US012727014B2

(12) United States Patent
Cao et al.

(10) Patent No.: US 12,727,014 B2
(45) Date of Patent: Sep. 1, 2026

(54) LOW POWER MONITORING WINDOW

(71) Applicant: QUALCOMM Incorporated, San Diego, CA (US)

(72) Inventors: Yiqing Cao, Beijing (CN); Peter Gaal, San Diego, CA (US); Bin Han, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/563,353

(22) PCT Filed: Jul. 5, 2021

(86) PCT No.: PCT/CN2021/104459
§ 371 (c)(1),
(2) Date: Nov. 21, 2023

(87) PCT Pub. No.: WO2023/279233
PCT Pub. Date: Jan. 12, 2023

(65) Prior Publication Data

US 2024/0276458 A1 Aug. 15, 2024

(51) Int. Cl.
*H04W 8/22* (2009.01)
*H04W 52/02* (2009.01)
(Continued)

(52) U.S. Cl.
CPC ............ *H04W 72/51* (2023.01); *H04W 8/22* (2013.01); *H04W 52/0235* (2013.01);
(Continued)

(58) Field of Classification Search
CPC .. H04L 5/0001–0098; H04W 4/30–80; H04W 8/22–245; H04W 28/02–065;
(Continued)

(56) References Cited

U.S. PATENT DOCUMENTS

2019/0387469 A1 12/2019 Wilhelmsson et al.
2020/0029302 A1* 1/2020 Cox .................. H04W 52/0229
(Continued)

FOREIGN PATENT DOCUMENTS

CN 110199548 A 9/2019
WO 2018017008 A1 1/2018
WO 2021004607 A1 1/2021

OTHER PUBLICATIONS

Huawei, et al., "On 'Wake-Up Signal' for eFeMTC", 3GPP TSG RAN WG1 Meeting #92, R1-1801430, Athens, Greece, Feb. 26, 2018-Mar. 2, 2018, 6 Pages, Mar. 2, 2018 (Mar. 2, 2018), the whole document.

(Continued)

*Primary Examiner* — Timothy J Weidner
(74) *Attorney, Agent, or Firm* — Procopio, Cory, Hargreaves & Savitch LLP

(57) ABSTRACT

To facilitate operations of a low-power UE with high RF sensitivity, methods, apparatuses, and computer-readable medium are provided. An example method includes receiving, from a base station or a second UE, a reservation reserving a set of time-domain resources and a set of frequency domain resources around a WUS for a low-power UE. The example method further includes refraining from transmitting in the reserved resources.

28 Claims, 14 Drawing Sheets

(51) Int. Cl.

| | |
|---|---|
| ***H04W 72/0446*** | (2023.01) |
| ***H04W 72/0453*** | (2023.01) |
| ***H04W 72/23*** | (2023.01) |
| ***H04W 72/25*** | (2023.01) |
| ***H04W 72/30*** | (2023.01) |
| ***H04W 72/40*** | (2023.01) |
| ***H04W 72/51*** | (2023.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |
| ***H04W 92/18*** | (2009.01) |

(52) U.S. Cl.

CPC ... *H04W 72/0446* (2013.01); *H04W 72/0453* (2013.01); *H04W 72/23* (2023.01); *H04W 72/25* (2023.01); *H04W 72/30* (2023.01); *H04W 72/40* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01); *Y02D 30/70* (2020.08)

(58) Field of Classification Search

CPC ..... H04W 48/02–16; H04W 52/02–60; H04W 72/02–569; H04W 76/10–50; H04W 84/005–22; H04W 88/02–12; H04W 92/02–18; Y02D 30/70

See application file for complete search history.

(56) References Cited

U.S. PATENT DOCUMENTS

| | | | | |
|---|---|---|---|---|
| 2020/0037396 | A1* | 1/2020 | Islam ................ | H04W 52/0229 |
| 2020/0359323 | A1 | 11/2020 | Beale et al. | |
| 2021/0204217 | A1* | 7/2021 | Balasubramanian ........................ | H04W 72/04 |
| 2021/0314851 | A1* | 10/2021 | Ratasuk ................ | H04W 72/04 |

OTHER PUBLICATIONS

International Search Report and Written Opinion—PCT/CN2021/104459—ISA/EPO—Apr. 7, 2022.

* cited by examiner

100
EPC
160
HSS
174
Other MMEs
164
MME
162
MBMS GW
168
BM-SC
170
172
Serving Gateway
166
PDN Gateway
IP Services
176
Core Network
190
Other AMFs
193
AMF
192
SMF
194
UPF
195
UDM
196
IP Services
197
Reservation Component
199
Base Station
102/180
Accommodation Component
198
UE
104
132/184
182
182'
182''
110
110 (110')
102 (102')
107
120
132
134
150
152
154
158
184

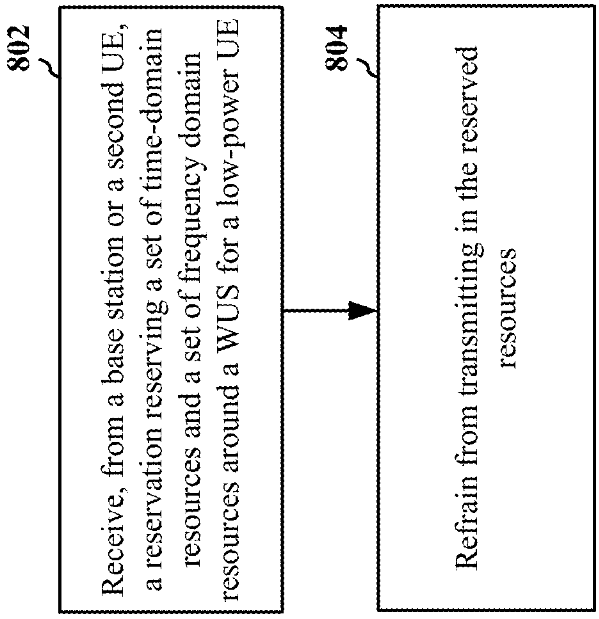
FIG. 8

LOW POWER MONITORING WINDOW

CROSS-REFERENCE TO RELATED APPLICATIONS

This application claims the benefit of and priority to International Application No. PCT/CN2021/104459, entitled "LOW POWER MONITORING WINDOW" and filed on Jul. 5, 2021, which is expressly incorporated by reference herein in its entirety.

TECHNICAL FIELD

The present disclosure relates generally to communication systems, and more particularly, to wireless communication systems with a wakeup signal (WUS) for low-power user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a UE are provided. The apparatus may include a memory and at least one processor coupled to the memory. The memory and the at least one processor coupled to the memory may be configured to receive, from a base station or a second UE, a reservation reserving a set of time-domain resources and a set of frequency domain resources around a WUS for a low-power UE. The memory and the at least one processor coupled to the memory may be further configured to refrain from transmitting in the reserved resources.

In another aspect of the disclosure, a method, a computer-readable medium, and an apparatus at a base station or a UE are provided. The apparatus may include a memory and at least one processor coupled to the memory. The memory and the at least one processor coupled to the memory may be configured to receive, from a low-power UE, a UE capability report indicating at least RF capability associated with the low-power UE. The memory and the at least one processor coupled to the memory may be further configured to transmit, to one or more UEs, a reservation reserving a set of time-domain resources and a set of frequency domain resources around a WUS for the low-power UE. The memory and the at least one processor coupled to the memory may be further configured to transmit the WUS to the low-power UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

DETAILED DESCRIPTION

Figure 1:
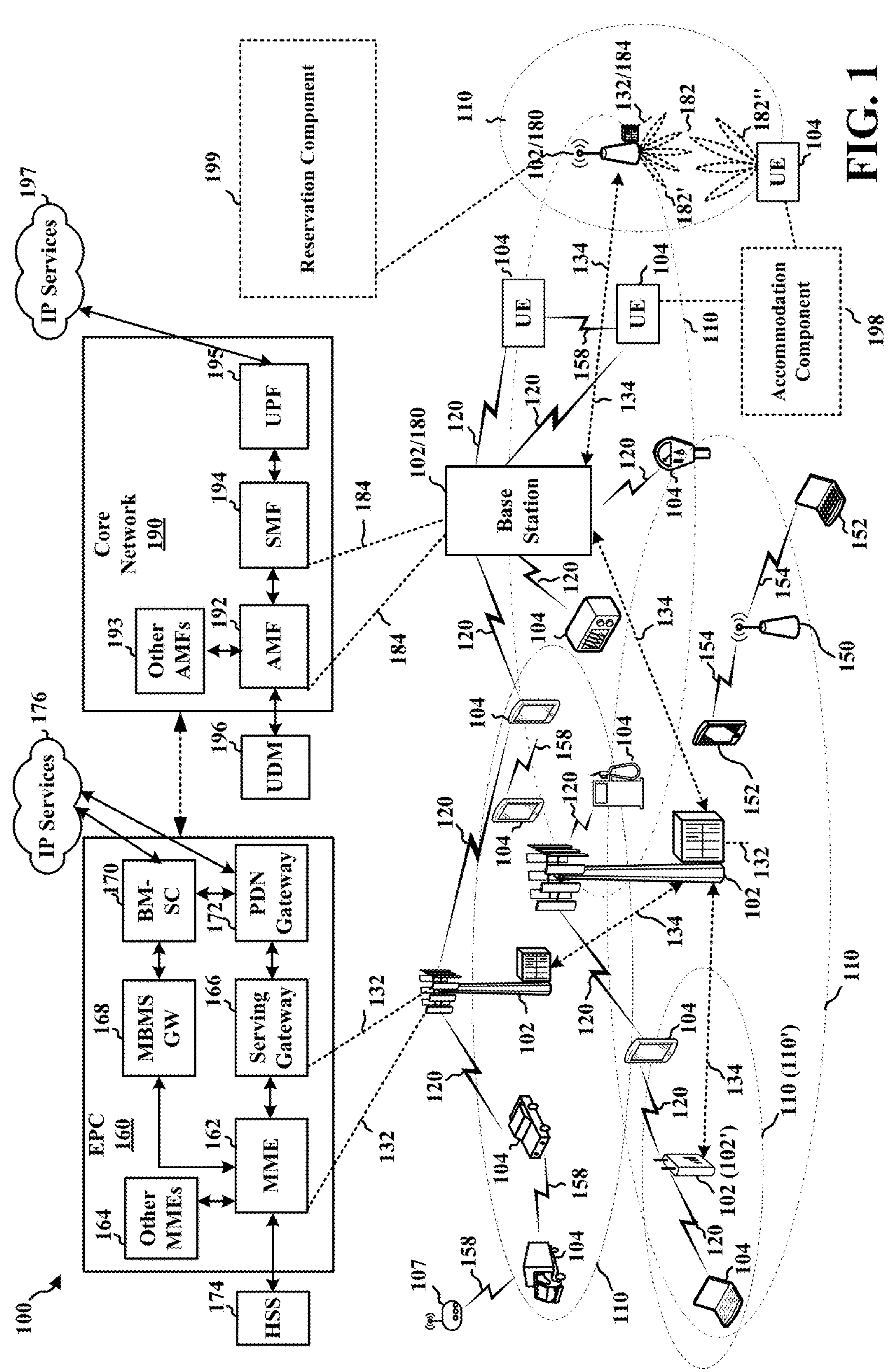
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an accommodation component 198. In some aspects, the accommodation component 198 may be configured to receive, from a base station or a second UE, a reservation reserving a set of time-domain resources and a set of frequency domain resources around a WUS for a low-power UE. In some aspects, the accommodation component 198 may be further configured to refrain from transmitting in the reserved resources.

In certain aspects, the base station 180 may include a reservation component 199. In some aspects, the reservation component 199 may be configured to receive, from a low-power UE, a UE capability report indicating at least RF capability associated with the low-power UE. In some aspects, the reservation component 199 may be further configured to transmit, to one or more UEs, a reservation reserving a set of time-domain resources and a set of frequency domain resources around a WUS for the low-power UE. In some aspects, the reservation component 199 may be further configured to transmit the WUS to the low-power UE.

Although the following description may be focused on 5G NR, the concepts described herein may be applicable to other similar areas, such as LTE, LTE-A, CDMA, GSM, and other wireless technologies.

Figures 2A, 2B, 2C, 2D:
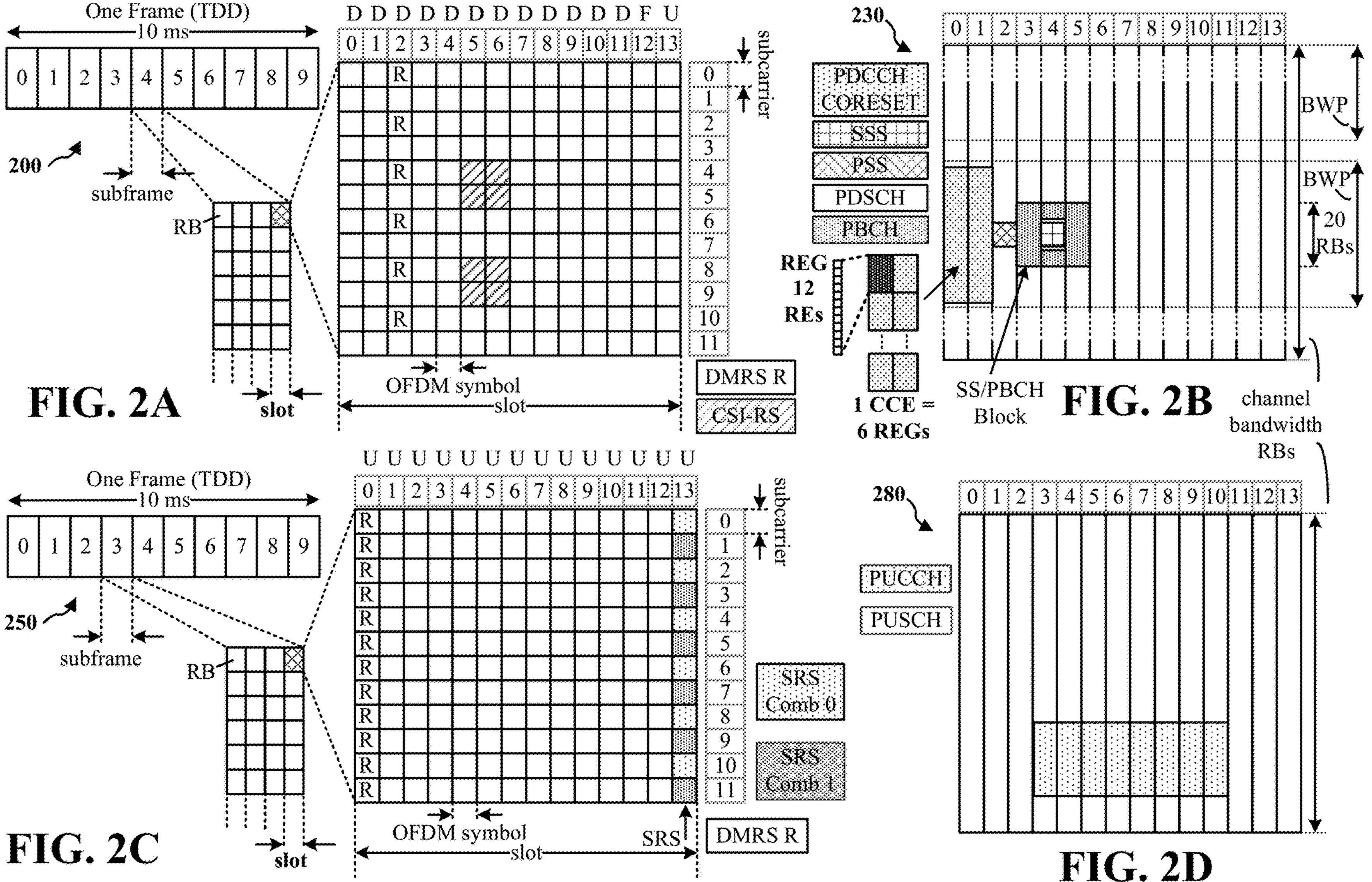
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
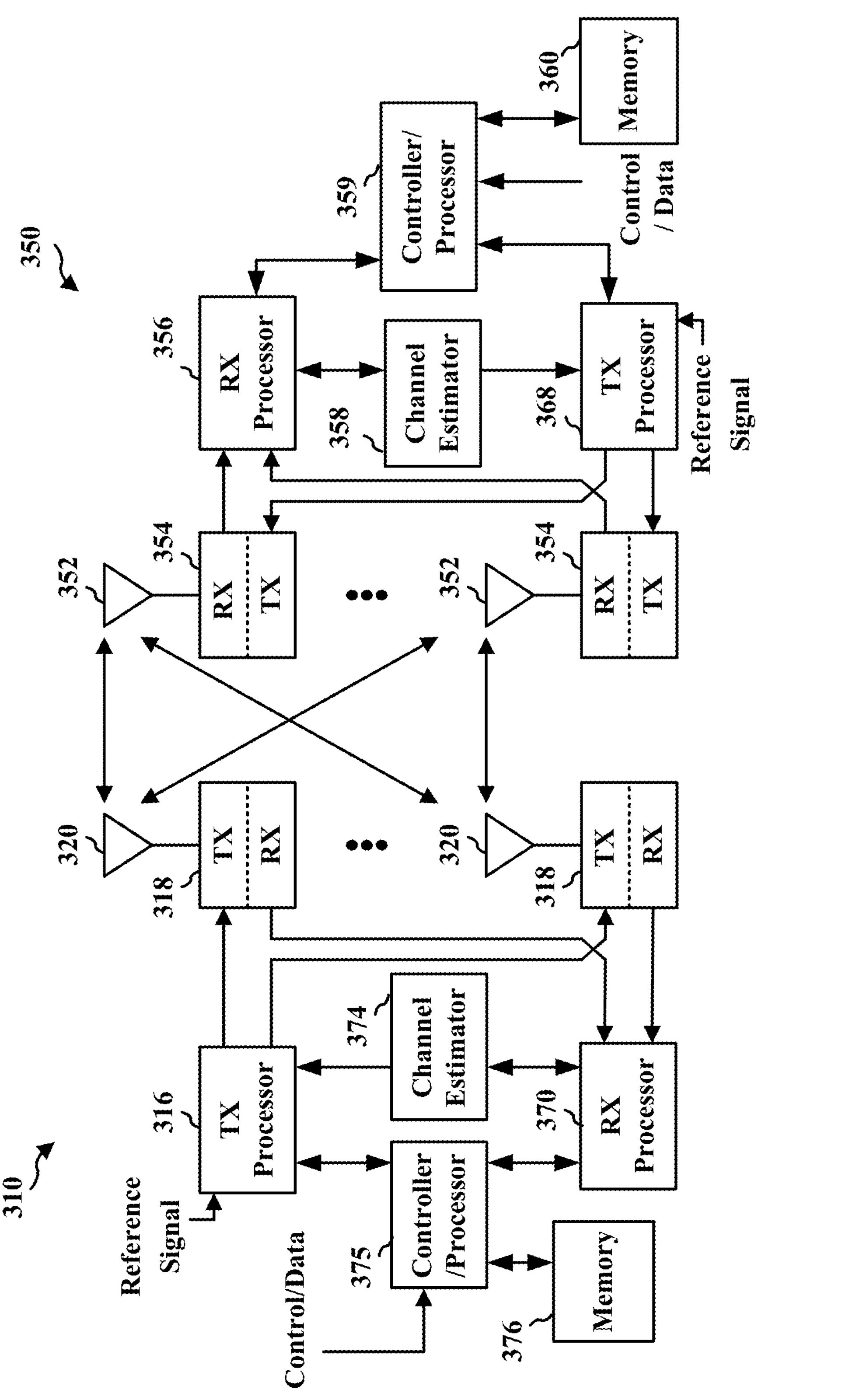
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the accommodation component 198 of FIG. 1.

At least one of the TX processor 316, the RX processor 370, and the controller/processor 375 may be configured to perform aspects in connection with the reservation component 199 of FIG. 1.

In addition to higher power UEs, wireless communication may support low-power UEs. Among others, examples of higher power UEs include smartphones, V2X devices, URLLC devices, eMBB devices, or the like. Among other examples, low-power UEs may include wearables, sensors in industrial wireless sensor networks (IWSN), surveillance cameras, a passive circuit with an envelope detector, a UE that operates based on energy harvesting, or the like. For example, NR communication systems may support both higher-power UEs and lower-power UEs. Lower-power UEs may communicate based on various types of wireless communication.

A lower-power UE may have a less powerful receiver compared with a higher-power UE. Due to the less powerful receiver, a lower-power UE may monitor wakeup signal with a higher receiver reference sensitivity. For example, a higher-power UE may have a power consumption between 30 milliwatts (mW) to 50 mWs and may have a radio frequency (RF) sensitivity of about −100 decibel-milliwatts (dBm). A first type of lower-power UE (which may be referred to as "almost-zero power UE") may have a lower power consumption and a higher RF sensitivity. For example, an example almost-zero power UE may have a power consumption of 7.4 nanowatts (nW) and a RF sensitivity of −71 dBm when operating at a 433 MHz frequency. Another example almost-zero power UE may have a power consumption of 99 microwatts (μW) and a RF sensitivity of −97 dBm when operating at a 2.4 GHz frequency. Another example almost-zero power UE may have a power consumption of 45 μW and a RF sensitivity of −87 dBm when operating at a 900 MHz frequency. A second type of lower-power UE (which may be referred to as "zero power UE") may have a zero power consumption and operates based on energy harvesting. An example zero power UE may have a RF sensitivity of −20 dBm or higher.

In addition to higher RF sensitivity, a lower-power UE may also have reduced transmission bandwidth or reception bandwidth than other UEs. For instance, a low-power UE may have a limited bandwidth of 20 MHz BWP in FR1 and/or 100 MHz in FR2. In some aspects, the lower-power UE may have an operating bandwidth between 5 MHz and 20 MHz for both transmission and reception, in contrast to other UEs which may have a bandwidth of up to 100 MHz or more than 100 MHz. As a further example, a lower-power UE may have a reduced number of reception antennas (e.g., 2 reception antennas) in comparison to other UEs that may have a larger number of reception antennas.

A WUS may be used to wake a UE from an idle state and the UE may accordingly prepare to receive a data transmission. A WUS may be an indication sent to the UE so that the UE may start monitoring one or more channels to receive paging. By entering into an idle state, a UE may save resources such as power and energy while remaining available for communication. A WUS mechanism may be used in connection with discontinuous reception (DRX) framework. For example, under a DRX framework, a UE may periodically wakeup to receive data. As an example, a UE may be configured by a base station for DRX. During an RRC connected state, when there is no data transmission in either direction (UL/DL), the UE may operate using the DRX mode. In the DRX mode, the UE starts monitoring the PDCCH channel discontinuously using a sleep and wake cycle. DRX conserves battery power at the UE. In a non-DRX mode, the UE monitors for PDCCH in each subframe to check whether there is downlink data available. Continuous monitoring of the PDCCH drains the UE's battery power. A DRX cycle may include a periodic repetition of an on duration in which the UE monitors for PDCCH from the base station and an off duration during which the UE may skip monitoring for the PDCCH. During the DRX off duration, the UE may enter a sleep mode or a low power mode in which the UE minimizes power consumption by shutting down a radio frequency (RF) function without detecting communication from the base station. Although aspects are described for a UE and a base station, a UE may similarly apply DRX for sidelink communication.

A base station may use a WUS to indicate to the UE whether there is a data packet or a paging message for the UE. If there is no data packet or no paging message for the UE to receive, e.g., as indicated by the absence of a WUS, the UE will not wakeup and may skip a DRX wakeup period to further save energy. Thus, the UE may skip wakeups when there is no data packet or paging message arrival, and the UE may proceed with extended sleep durations to save energy.

Because a lower-power UE may have a higher RF sensitivity, a WUS for a lower-power UE may be much more sensitive with interference compared with a RS for a higher-power UE. Example aspects are provided herein to resolve the potential interference issue and provide more reliable WUS for lower-power UEs by blanking the resource(s) around the WUS to avoid power leakage on the WUS from adjacent RBs. For example, other UEs that are connected to a same base station as a lower-power UE may receive from the base station or another UE, a reservation reserving a set of time-domain resources and a set of frequency domain resources around a WUS for a lower-power UE. The other UEs may accordingly refrain from transmitting in the reserved resources, therefore blanking the resources (e.g., the set of time-domain resources and the set of frequency domain resources) around the WUS to avoid power leakage on the WUS from adjacent RBs. The term "blank" may be used to refer to causing UEs and base stations to refrain from transmitting in certain resources, such as resources around the WUS.

Figure 4:
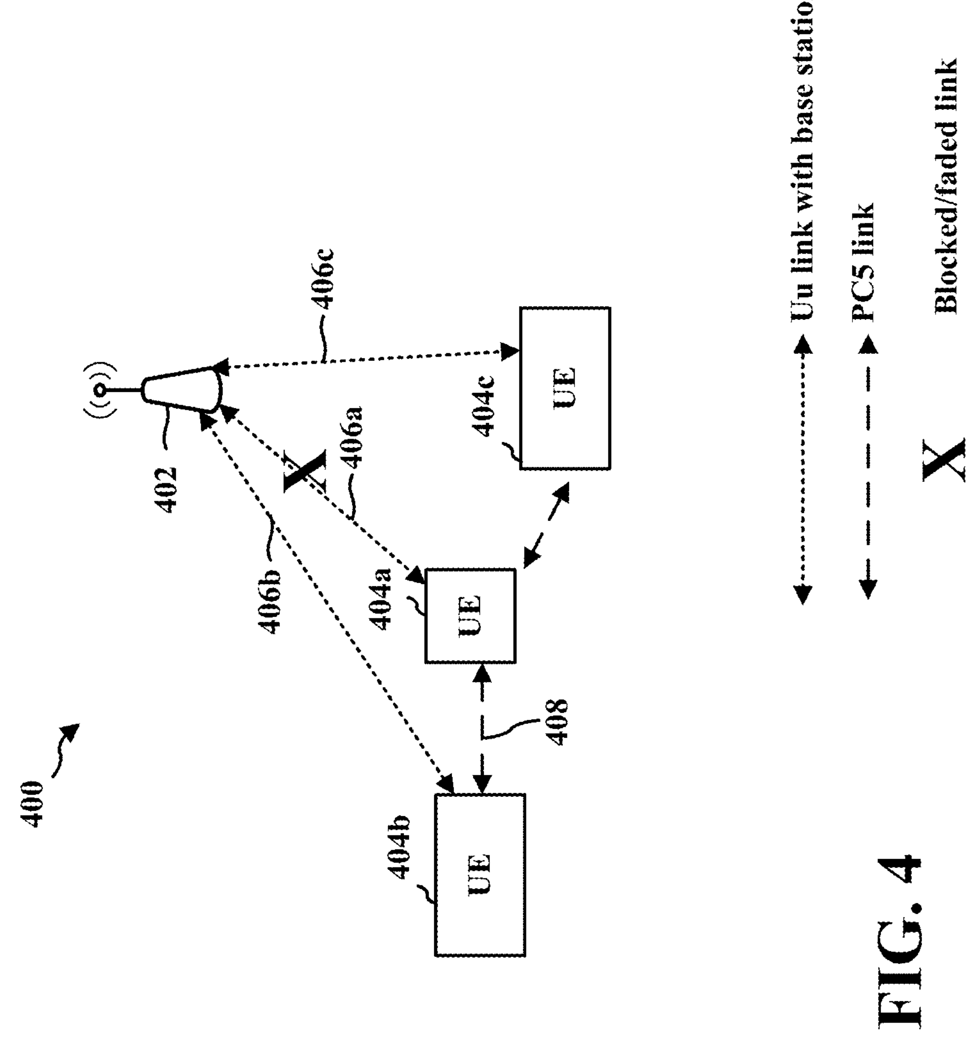
FIG. 4 is a diagram illustrating sidelink communications.

FIG. 4 illustrates an example of wireless communication systems 400, in accordance with aspects of the present disclosure. The wireless communication system 400 includes a base station 402 and UEs 404*a*, 404, and 404*c*. In the illustrated example, the base station 402 may establish respective communication links 406*a*, 406*b*, 406*c* with the UEs 404*a*, 404*b*, 404*c*.

Due to an issue, such as blockage or fading, the communication link 406*a* between the base station 402 and the first (or target) UE 404*a* may be degraded, fail, or be dropped. Accordingly, the base station 402 may leverage sidelink channels (e.g., a sidelink channel 408) to communicate with the target UE 404*a*. In the illustrated example of FIG. 4, the base station 402 may determine that the second UE 404*b* (or other TRP) is in, or near, a helping group of devices that are able to facilitate communication between the base station 402 and the target UE 404*a*. Accordingly, in FIG. 4, the second UE 404*b* may help or assist the target UE 404*a* by forwarding or retransmitting data received from the base station 402 to the target UE 404*a* through the sidelink 408.

In some examples, to facilitate communication between the base station 402 and the target UE 404*a*, the base station 402 may transmit communication to one or more UEs 404*b* and 404*c* near the target UE 404*a* for relaying the communication to the target UE 404*a* over a sidelink. For a target UE 404*a* to receive a reservation reserving a set of time-domain resources and a set of frequency domain resources around a WUS for a low-power UE, the target UE 404*a* may receive the reservation from the UE 404*a*/404*b* or from the base station 402. There may be two sidelink resource allocation modes. In a first sidelink resource allocation mode, a UE may receive a resource allocation for sidelink communication from a central entity, such as the base station 402. The sidelink resource allocation that includes receiving allocation from a base station may be referred to as "resource allocation mode 1" or a "centralized" resource allocation mode, e.g., in which a network entity allocates sidelink resources for multiple UEs. In a second resource allocation mode, a UE may autonomously determine resources for sidelink transmissions by sensing, or monitoring, for reservations of other UEs. The autonomous resource selection may be referred to as "resource allocation mode 2," a "decentralized" resource allocation mode, or a sensing-based sidelink resource allocation mode, e.g., where each UE selects its own sidelink resources for sidelink transmissions. In the decentralized sidelink resource allocation mode, rather than receiving an allocation of sidelink resources from a network entity, a UE may determine the sidelink transmission resource(s) based on a sensing and resource reservation procedure. As one example, in resource allocation mode 1, the target UE 404_a_ may reservation reserving a set of time-domain resources and a set of frequency domain resources around a WUS for a low-power UE from another UE, such as the UE 404_b_ or the UE 404_c_. As another example, in resource allocation mode 2, the target UE 404_a_ may reservation reserving a set of time-domain resources and a set of frequency domain resources around a WUS for a low-power UE from the base station 402.

Figure 5:
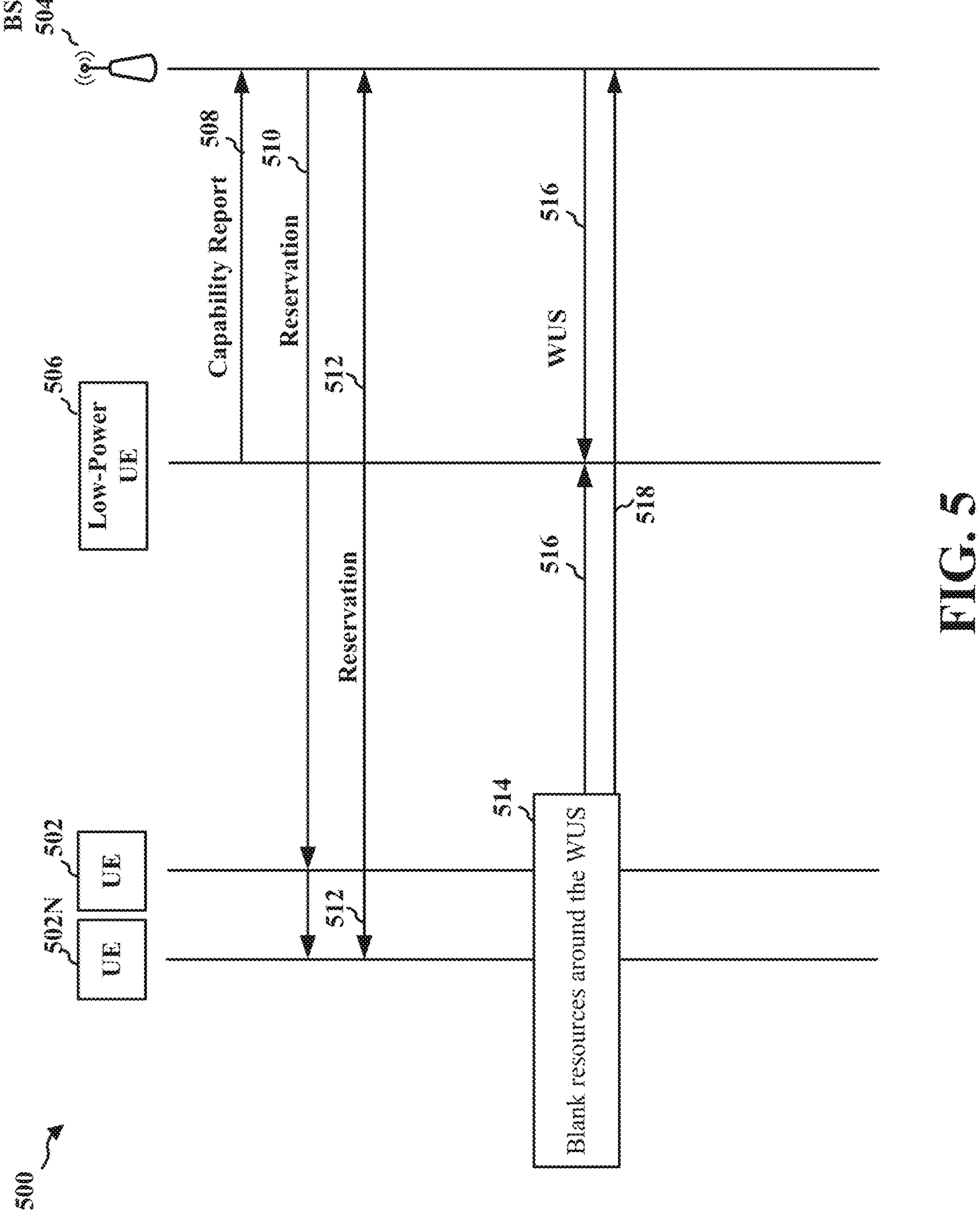
FIG. 5 illustrates an example communication flow between UEs and a base station.

FIG. 5 illustrates an example communication flow 500 between UEs 502 and 502N, a low-power UE 506, and a base station 504. In some aspects, the UE 502 may be in communication with the UE 502N via sidelink. In some aspects, the UE 502N may be not in communication with the UE 502 via sidelink and the UE 502N may be in communication with the base station 504 directly. In some aspects, the low-power UE 506 may be an almost zero power UE or a zero power UE as previously described. As illustrated in FIG. 5, the low-power UE 506 may transmit a capability report 508 to the base station 504, such as by transmitting a capability report 508 upon establishing a radio resource control (RRC) connection with the base station 504. In some aspects, the capability report 508 may be forward by the base station 504 to one or more sidelink relaying UEs, such as the UE 502. The capability report 508 may indicate RF capability of the low-power UE 506. For example, the capability report 508 may indicate that the low-power UE 506 is a low-power UE with higher RF sensitivity. The capability report 508 may further include other capability information, such as RF related parameters, physical layer related parameters, medium access control (MAC) related parameters, capability band, UE category (such as low-power or not), UE supported features, radio resource management (RRM) measurement related parameters, or the like. The low-power UE 506 may enter an idle state some point after establishing connection with the base station 504 and transmitting the capability report 508.

Figures 6A, 6B:
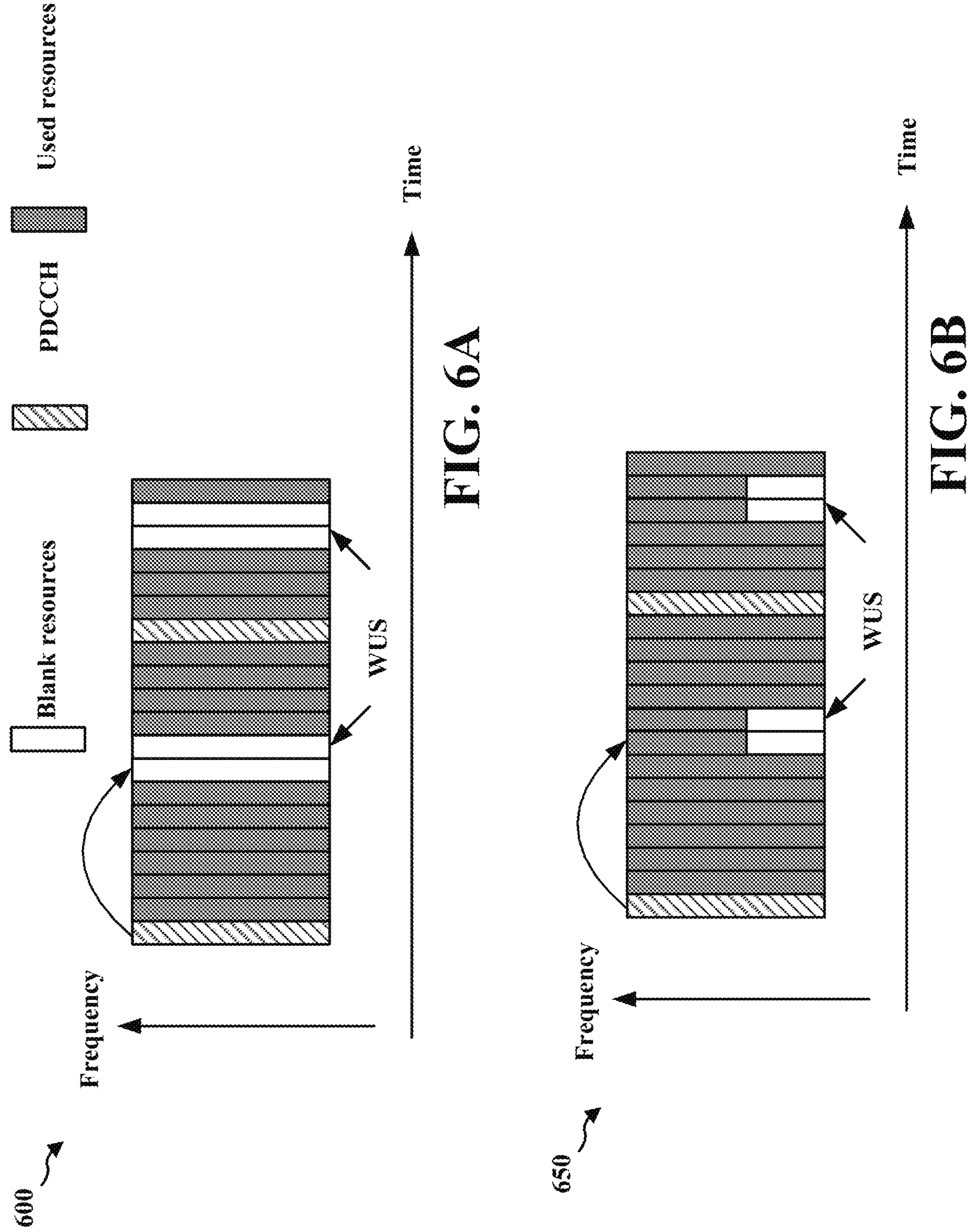
FIGS. 6A and 6B illustrate example blanking of resource(s) around WUS in downlink (DL).

After receiving the capability report 508 and after determining data to be transmitted to the low-power UE 506, the base station 504 may transmit a reservation 510 for blanking resource(s) around a WUS for the low-power UE 506 to one or more UEs that the base station is in communication with, such as the UE 502 and the UE 502N. The reservation 510 may be transmitted via PDCCH. The reservation 512 may reserve resources so that the resources may be blanked around a WUS resource. For example, the reservation 510 may reserve to blank an entire frequency band around a WUS. In another example, the reservation the reservation 510 may reserve to blank a partial frequency band around a WUS. As two examples, FIGS. 6A and 6B illustrate example blanking of resource(s) around WUS in DL. In example 600 of FIG. 6A, the reservation 510 in PDCCH may reserve to blank an entire frequency band around a WUS. In example 650 of FIG. 6B, the reservation 510 in PDCCH may reserve to blank a partial frequency band around a WUS. As illustrated in FIGS. 6A and 6B and FIGS. 7A and 7B, a WUS may be transmitted in repetition in order to accumulate the received power to guarantee the received signal strength. In some aspects, WUS may be transmitted similar to transmission of CSI-RS. In some aspects, the number of repetitions may be configurable and the reservation may reserve multiple consecutive or non-consecutive symbols near the WUS.

In some aspects, the reservation 510 may reserve resources with flexible granularity in the frequency domain where a defined set of frequency resources that is not a full band or a half band may be reserved. For example, the reservation 510 may reserve a defined set of frequency resources around the WUS. In addition, the reservation 510 may also include an indication of the WUS and an associated RRC configuration including periodicity, RS pattern, or the like. In some aspects, the reservation 510 may indicate a time-domain of the reserved resources via a bitmap. For example, a bitmap including one or more pre-emption indication (PI) where each PI include a number of bits and each bit representing one symbol may be used. The bitmap may be similar to a bitmap in DCI format 2_1 with DL PIs. In another example, a bitmap including one or more bits where each bit of the one or more bits representing a number of symbols may be used. The symbol(s) represented by each bit may be one symbol or one or more consecutive or defined non-consecutive symbols. In some aspects, the time-domain of the reserved resources may be represented by a starting symbol and one or more reserved symbol numbers representing reserved symbols in the reservation 510. In some aspects, the reservation 510 may indicate a frequency-domain of the reserved resources via a bitmap. In some aspects, the bitmap may not be used because the entire band may be reserved.

Figures 7A, 7B:
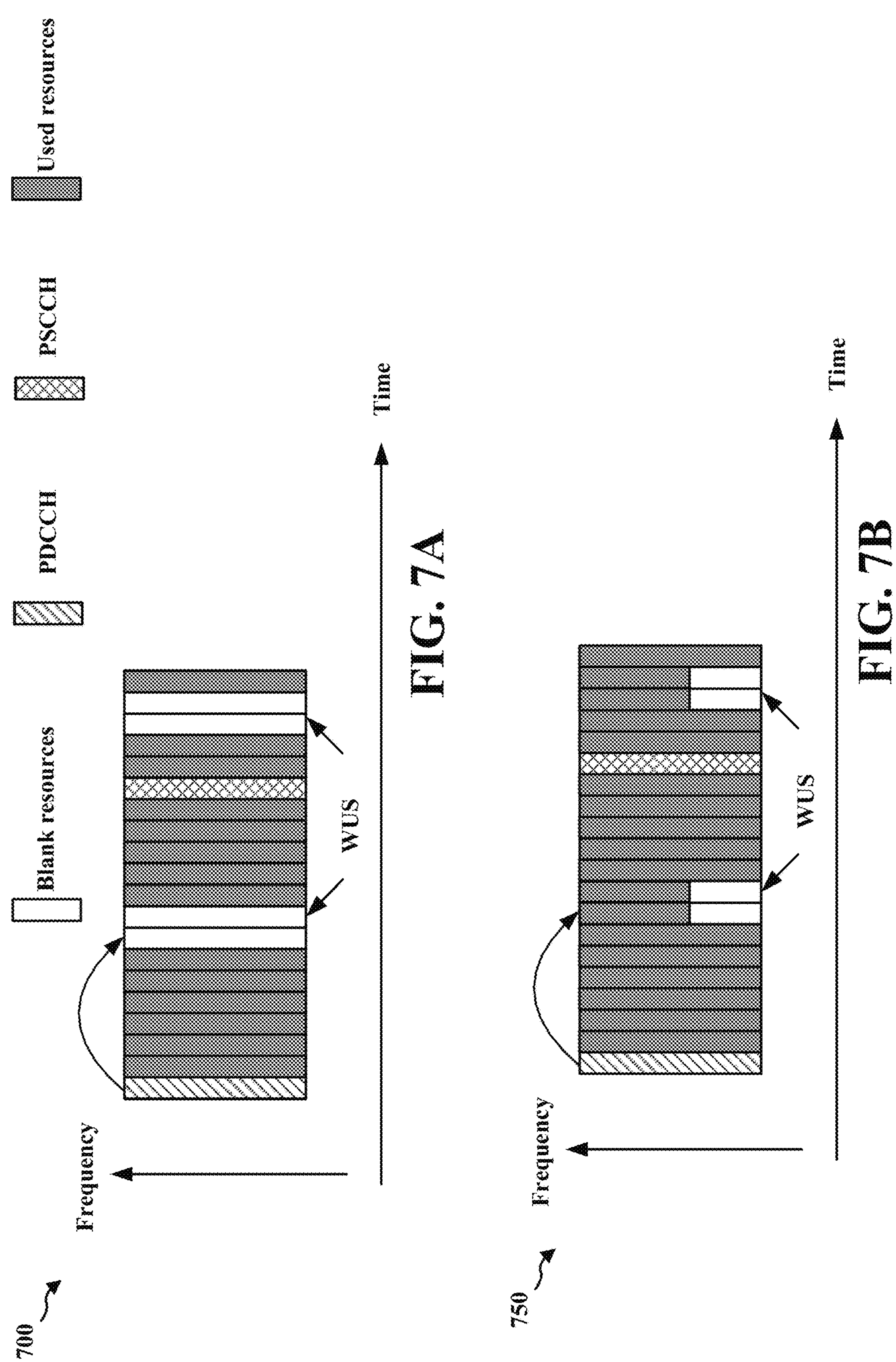
FIGS. 7A and 7B illustrate example blanking of resource(s) around WUS in sidelink (SL).

In some aspects where the UE 502N is connected to the UE 502 via sidelink and where resource allocation mode 2 is used, the UE 502 may transmit a reservation 512 for blanking resource(s) around a WUS for the low-power UE 506 to one or more UEs, such as the UE 502N, or the base station 504. The reservation 512 may be transmitted via PSCCH. The reservation 512 may reserve resources so that the resources may be blanked around a WUS resource. For example, the reservation 512 may reserve to blank an entire frequency band around a WUS. In another example, the reservation the reservation 512 may reserve to blank a partial frequency band around a WUS. As two examples, FIGS. 7A and 7B illustrate example blanking of resource(s) around WUS in SL. In example 700 of FIG. 7A, the reservation 512 in PSCCH may reserve to blank an entire frequency band around a WUS. In example 750 of FIG. 7B, the reservation 512 in PSCCH may reserve to blank a partial frequency band around a WUS. In some aspects, the reservation 512 may reserve resources with flexible granularity in the frequency domain where a defined set of frequency resources that is not a full band or a half band may be reserved. For example, the reservation 512 may reserve a defined set of frequency resources around the WUS. In addition, the reservation 512 may also include an indication of the WUS and an associated RRC configuration including periodicity, RS pattern, or the like.

In some aspects, the reservation 512 may indicate a time-domain of the reserved resources via a bitmap. For example, a bitmap including one or more PIs where each PI include a number of bits and each bit representing one symbol may be used. The bitmap may be similar to a bitmap in DCI format 2_1 with DL PIs. In another example, a bitmap including one or more bits where each bit of the one or more bits representing a number of symbols may be used. The symbol(s) represented by each bit may be one symbol or one or more consecutive or defined non-consecutive symbols. In some aspects, the time-domain of the reserved resources may be represented by a starting symbol and one or more reserved symbol numbers representing reserved symbols in the reservation 512. In some aspects, the reservation 512 may indicate a frequency-domain of the reserved resources via a bitmap. In some aspects, the bitmap may not be used because the entire band may be reserved.

In some aspects where the UE 502N is connected to the UE 502 via sidelink and where resource allocation mode 1 is used, the base station 504 may still transmit reservation 510 to the UE 502 and the UE 502N. As illustrated in FIGS. 7A and 7B, the reservation 510 in PDCCH may reserve to blank a partial frequency band around a WUS in example 750 or may reserve to blank an entire frequency band in example 700.

After receiving the reservation 510 or the reservation 512, the UE 502N or the UE 502 may blank resources around the WUS at 514. The low-power UE 506 may receive the WUS 516 from the base station 504 or the UE 502. In some aspects, for SL, no reservation 510 or reservation 512 may be transmitted and a defined set of resources around the WUS may be reserved. The UEs 502 and 502N, the base station 504, or the low-power UE 506 may be aware of the defined set of resources beforehand. For example, the defined set of resources may be a defined frequency range (such as an entire band or part of a band) associated with one or more defined symbols in a slot, such as a last symbol, a first symbol, one or more symbols around a DL/UP gap, or the like.

In some aspects, the reservation 512 may reserve the resources as "not recommended" and a UE may deviate from the reservation 512. For example, even after the UE 502N receives a reservation 512 to blank resource(s) around a WUS, the UE 502N may still transmit in the "not recommended" resources around a WUS at 518.

FIG. 8 is a flowchart 800 of a method of wireless communication. The method may be performed by a UE (e.g., the UE 104, the UE 502N; the apparatus 1002). The method may be used for blanking resource(s) around WUS to avoid power leakage from adjacent RBs to facilitate more efficient operations of a low-power UE.

At 802, the UE may receive, from a base station or a second UE, a reservation reserving a set of time-domain resources and a set of frequency domain resources around a WUS for a low-power UE. For example, the UE 502N may receive, from a base station 504 or a second UE 502, a reservation 510 or 512 reserving a set of time-domain resources and a set of frequency domain resources around a WUS 516 for a low-power UE 506. In some aspects, 802 may be performed by reservation component 1042 in FIG. 10.

At 804, the UE may refrain from transmitting in the reserved resources. For example, the UE 502N may refrain from transmitting in the reserved resources at 514. In some aspects, 804 may be performed by refrain component 1044 in FIG. 10.

Figure 9:
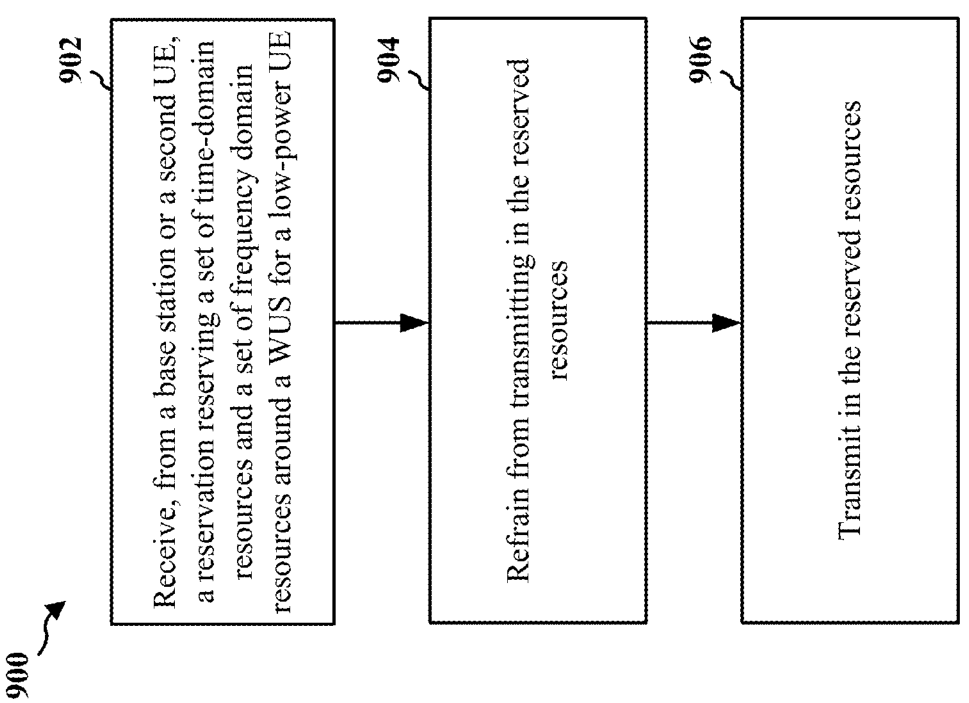
FIG. 9 is a flowchart of a method of wireless communication.

FIG. 9 is a flowchart 900 of a method of wireless communication. The method may be performed by a UE (e.g., the UE 104, the UE 502N; the apparatus 1002). The method may be used for blanking resource(s) around WUS to avoid power leakage from adjacent RBs to facilitate more efficient operations of a low-power UE.

At 902, the UE may receive, from a base station or a second UE, a reservation reserving a set of time-domain resources and a set of frequency domain resources around a WUS for a low-power UE. For example, the UE 502N may receive, from a base station 504 or a second UE 502, a reservation 510 or 512 reserving a set of time-domain resources and a set of frequency domain resources around a WUS 516 for a low-power UE 506. In some aspects, 902 may be performed by reservation component 1042 in FIG. 10. In some aspects, the set of time domain resources is represented by a bitmap in the reservation. In some aspects, the bitmap includes one or more PI, each PI including X number of bits, X being a positive integer, each bit representing one symbol. In some aspects, the bitmap includes one or more bits, each bit of the one or more bits representing X consecutive or non-consecutive symbols, X being an integer greater than or equal to one. In some aspects, the set of time domain resources is represented by a starting symbol and one or more reserved symbol numbers representing reserved symbols. In some aspects, the set of frequency domain resources includes an active BWP associated with the WUS. In some aspects, the set of frequency domain resources includes one or more sub-bands in an active BWP associated with the WUS, and the one or more sub-bands may be represented by a bitmap in the reservation. In some aspects, the reservation reserves a defined set of resources associated with the WUS. In some aspects, the defined set of resources includes one or more defined symbols, such as a last symbol, a first symbol, or one or more symbols around a gap, of a slot associated with the WUS. In some aspects, the reservation is received from the second UE via a PSCCH. In some aspects, the reservation is received from the base station via a PDCCH. In some aspects, the reservation is for blanking the set of time-domain resources and the set of frequency-domain resources around the WUS to avoid power leakage from adjacent RBs.

At 904, the UE may refrain from transmitting in the reserved resources. For example, the UE 502N may refrain from transmitting in the reserved resources at 514. In some aspects, 904 may be performed by refrain component 1044 in FIG. 10.

In some aspects, the reservation labels the reserved resources as not recommended, and the UE may transmit in the reserved resources at 906. For example, the UE 502N may transmit in the reserved resources at 518.

Figure 10:
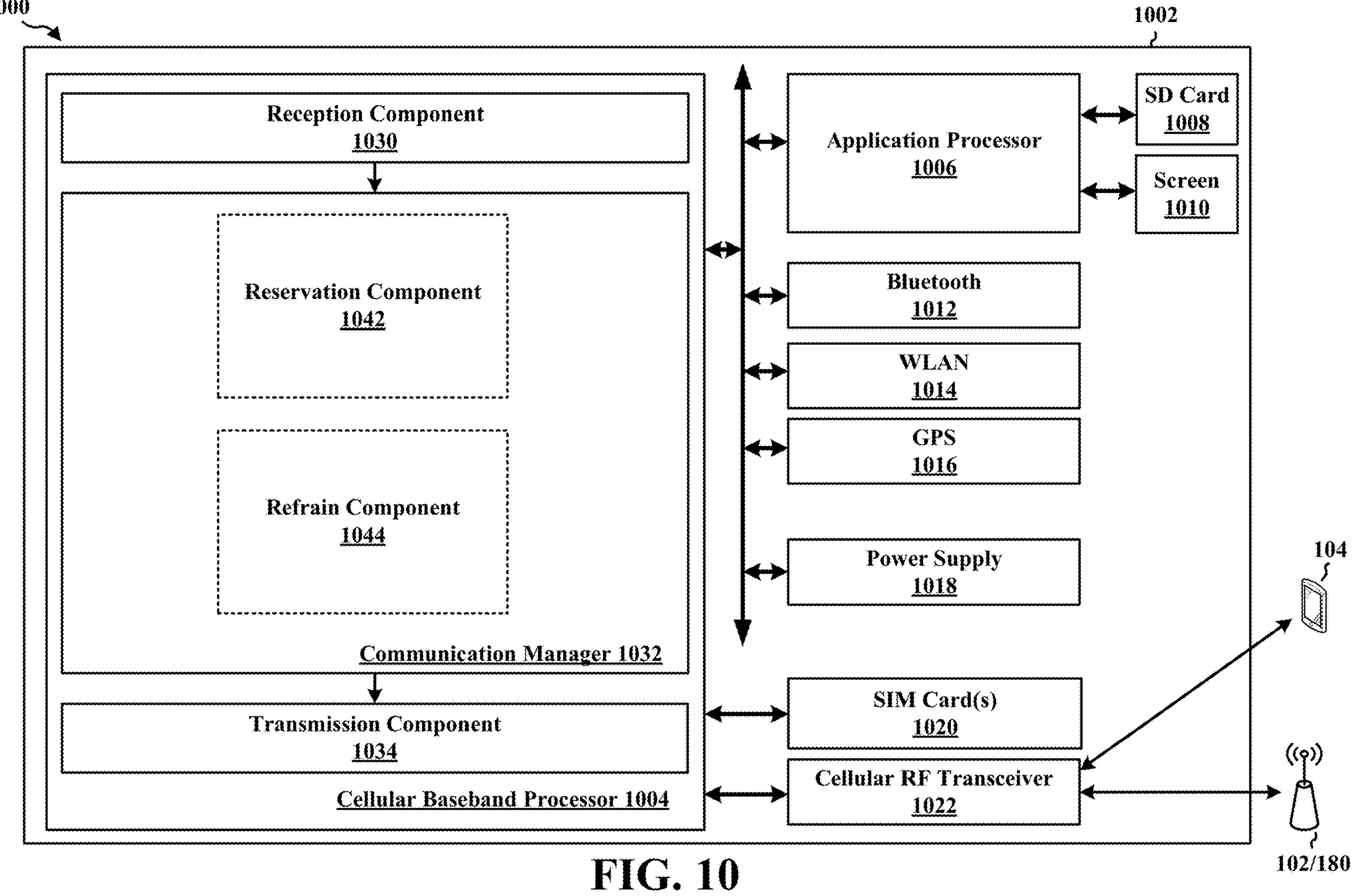
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the additional modules of the apparatus 1002.

The communication manager 1032 may include a reservation component 1042 that is configured to receive, from a base station or a second UE, a reservation reserving a set of time-domain resources and a set of frequency domain resources around a WUS for a low-power UE, e.g., as described in connection with 802 in FIGS. 8 and 902 in FIG. 9. The communication manager 1032 may further include a refrain component 1044 that may be configured to refrain from transmitting in the reserved resources, e.g., as described in connection with 804 in FIGS. 8 and 904 in FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, may include means for receiving, from a base station or a second UE, a reservation reserving a set of time-domain resources and a set of frequency domain resources around a WUS for a low-power UE. The cellular base band processor 1004 may further include means for refraining from transmitting in the reserved resources. The cellular baseband processor 1004 may further include means for transmitting in the reserved resources. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
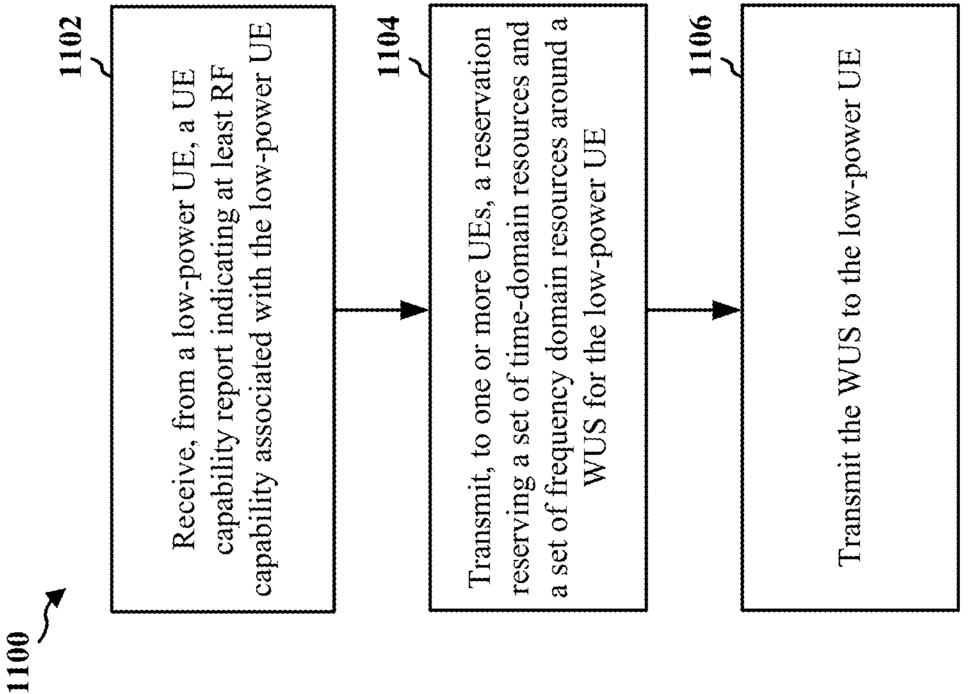
FIG. 11 is a flowchart of a method of wireless communication.

FIG. 11 is a flowchart 1100 of a method of wireless communication. The method may be performed by a base station or a UE (e.g., the base station 102/180, the base station 504, the UE 502; the apparatus 1302). The method may be used for blanking resource(s) around WUS to avoid power leakage from adjacent RBs to facilitate more efficient operations of a low-power UE.

At 1102, the base station or UE may receive, from a low-power UE, a UE capability report indicating at least RF capability associated with the low-power UE. For example, the base station 504 may receive, from a low-power UE 502, a UE capability report 508 indicating at least RF capability associated with the low-power UE. In some aspects, 1102 may be performed by capability component 1342 in FIG. 13.

At 1104, the base station may transmit, to one or more UEs, a reservation reserving a set of time-domain resources and a set of frequency domain resources around a WUS for the low-power UE. For example, the base station 504 or the UE 502 may transmit, to one or more UEs 502N, a reservation 510 or 512 reserving a set of time-domain resources and a set of frequency domain resources around a WUS 516 for the low-power UE 506. In some aspects, 1104 may be performed by reservation component 1344 in FIG. 13.

At 1106, the base station or the UE may transmit the WUS to the low-power UE. For example, the base station 504 or the UE 502 may transmit the WUS 516 to the low-power UE 506. In some aspects, 1106 may be performed by WUS component 1346 in FIG. 13.

Figure 12:
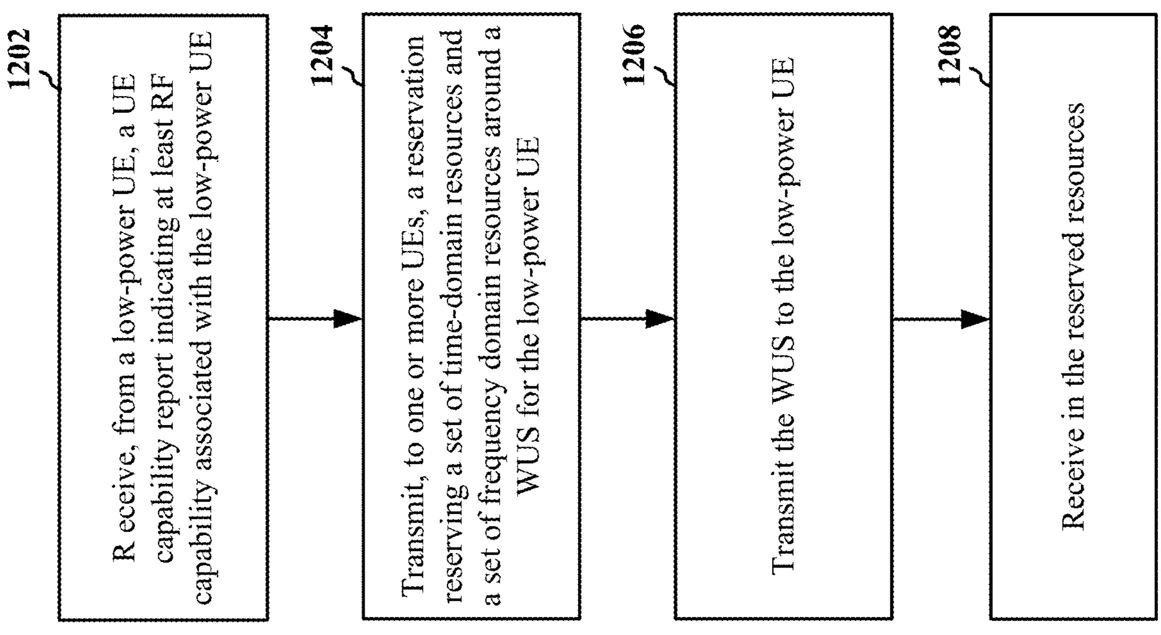
FIG. 12 is a flowchart of a method of wireless communication.
Figure 12:

FIG. 12 is a flowchart 1200 of a method of wireless communication. The method may be performed by a base station or a UE (e.g., the base station 102/180, the base station 504, the UE 502; the apparatus 1302). The method may be used for blanking resource(s) around WUS to avoid power leakage from adjacent RBs to facilitate more efficient operations of a low-power UE.

At 1202, the base station or UE may receive, from a low-power UE, a UE capability report indicating at least RF capability associated with the low-power UE. For example, the base station 504 may receive, from a low-power UE 502, a UE capability report 508 indicating at least RF capability associated with the low-power UE. In some aspects, 1202 may be performed by capability component 1342 in FIG. 13.

At 1204, the base station may transmit, to one or more UEs, a reservation reserving a set of time-domain resources and a set of frequency domain resources around a WUS for the low-power UE. For example, the base station 504 or the UE 502 may transmit, to one or more UEs 502N, a reservation 510 or 512 reserving a set of time-domain resources and a set of frequency domain resources around a WUS 516 for the low-power UE 506. In some aspects, 1204 may be performed by reservation component 1344 in FIG. 13. In some aspects, the set of time domain resources is represented by a bitmap in the reservation. In some aspects, the bitmap includes one or more PI, each PI including X number of bits, X being a positive integer, each bit representing one symbol. In some aspects, the bitmap includes one or more bits, each bit of the one or more bits representing X consecutive or non-consecutive symbols, X being an integer greater than or equal to one. In some aspects, the set of time domain resources is represented by a starting symbol and one or more reserved symbol numbers representing reserved symbols. In some aspects, the set of frequency domain resources includes an active BWP associated with the WUS. In some aspects, the set of frequency domain resources includes one or more sub-bands in an active BWP associated with the WUS, and the one or more sub-bands may be represented by a bitmap in the reservation. In some aspects, the reservation reserves a defined set of resources associated with the WUS. In some aspects, the defined set of resources includes one or more defined symbols, such as a last symbol, a first symbol, or one or more symbols around a gap, of a slot associated with the WUS. In some aspects, the reservation is transmitted via a PSCCH. In some aspects, the reservation is tranmitted via a PDCCH. In some aspects, the reservation is for blanking the set of time-domain resources and the set of frequency-domain resources around the WUS to avoid power leakage from adjacent RBs.

At 1206, the base station or the UE may transmit the WUS to the low-power UE. For example, the base station 504 or the UE 502 may transmit the WUS 516 to the low-power UE 506. In some aspects, 1206 may be performed by WUS component 1346 in FIG. 13.

In some aspects, the reservation labels the reserved resources as not recommended, and the UE may receive in the reserved resources at 1208. For example, the base station 504 may receive in the reserved resources at 518.

Figure 13:
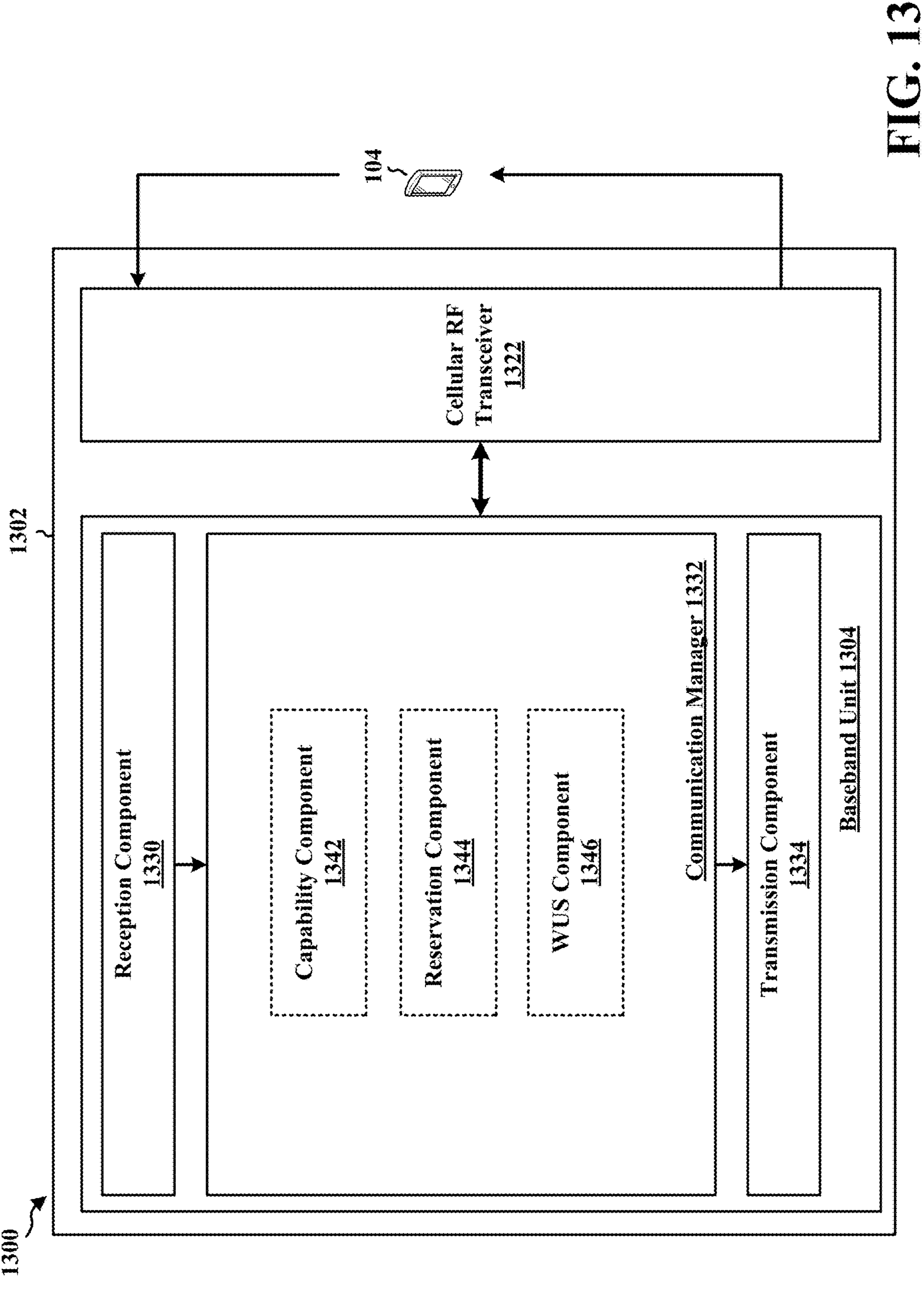
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1002 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 may include a capability component 1342 that may receive, from a low-power UE, a UE capability report indicating at least RF capability associated with the low-power UE, e.g., as described in connection with 1102 in FIGS. 11 and 1202 in FIG. 12. The communication manager 1332 may further include a reservation component 1344 that may transmit, to one or more UEs, a reservation reserving a set of time-domain resources and a set of frequency domain resources around a WUS for the low-power UE, e.g., as described in connection with 1104 in FIGS. 11 and 1204 in FIG. 12. The communication manager 1332 may further include a reservation component 1344 that may transmit the WUS to the low-power UE, e.g., as described in connection with 1106 in FIGS. 11 and 1206 in FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, may include means for receiving, from a low-power UE, a UE capability report indicating at least RF capability associated with the low-power UE. The baseband unit 1304 may further include means for transmitting, to one or more UEs, a reservation reserving a set of time-domain resources and a set of frequency domain resources around a WUS for the low-power UE. The baseband unit 1304 may further include means for transmitting the WUS to the low-power UE. The baseband unit 1304 may further include means for receiving in the reserved resources. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
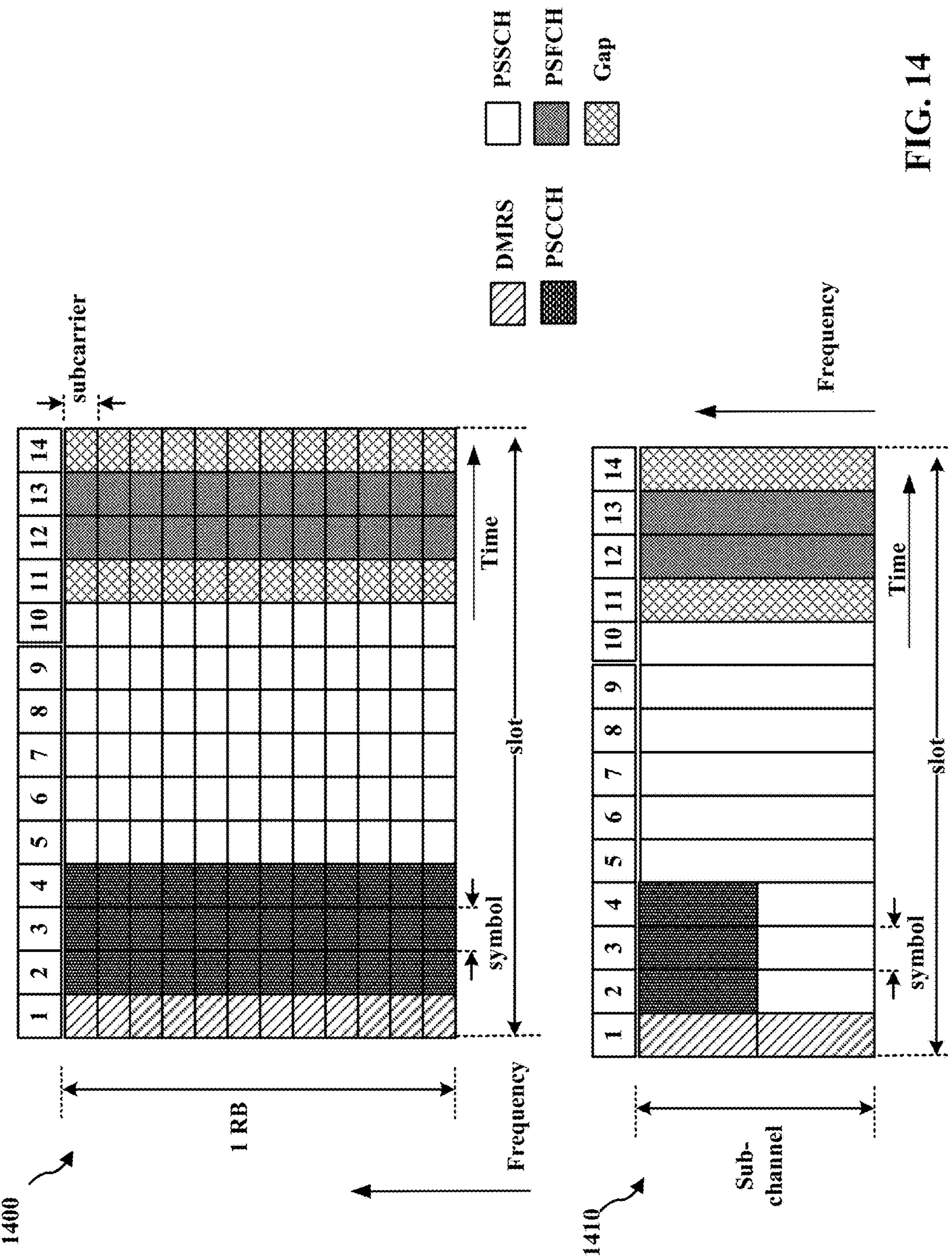
FIG. 14 illustrates example aspects of a sidelink slot structure.

FIG. 14 includes diagrams 1400 and 1410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 14 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 1400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 1410 in FIG. 14 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 14, some of the REs may include control information in PSCCH and some REs may include demodulation RS (DMRS). At least one symbol may be used for feedback. FIG. 14 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 14. Multiple slots may be aggregated together in some aspects.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including: a memory; and at least one processor coupled to the memory and configured to: receive, from a base station or a second UE, a reservation reserving a set of time-domain resources and a set of frequency domain resources around a WUS for a low-power UE; and refrain from transmitting in the reserved resources.

Aspect 2 is the apparatus of aspect 1, wherein the set of time domain resources is represented by a bitmap in the reservation.

Aspect 3 is the apparatus of any of aspects 1-2, wherein the bitmap includes one or more PI, each PI including X number of bits, X being a positive integer, each bit representing one symbol.

Aspect 4 is the apparatus of any of aspects 1-2, wherein the bitmap includes one or more bits, each bit of the one or more bits representing X symbols, X being an integer greater than or equal to one.

Aspect 5 is the apparatus of any of aspects 1-2, wherein the set of time domain resources is represented by a starting symbol and one or more reserved symbol numbers representing reserved symbols.

Aspect 6 is the apparatus of any of aspects 1-5, wherein the set of frequency domain resources includes an active BWP associated with the WUS.

Aspect 7 is the apparatus of any of aspects 1-5, wherein the set of frequency domain resources includes one or more sub-bands in an active BWP associated with the WUS, and the one or more sub-bands represented by a bitmap in the reservation.

Aspect 8 is the apparatus of any of aspects 1-7, wherein the reservation reserves a defined set of resources associated with the WUS.

Aspect 9 is the apparatus of any of aspects 1-8, wherein the defined set of resources includes a defined symbol of a slot associated with the WUS.

Aspect 10 is the apparatus of any of aspects 1-9, wherein the reservation labels the reserved resources as not recommended, and wherein the at least one processor is further configured to: transmit in the reserved resources.

Aspect 11 is the apparatus of any of aspects 1-10, wherein the reservation is received from the second UE via a PSCCH.

Aspect 12 is the apparatus of any of aspects 1-10, wherein the reservation is received from the base station via a PDCCH.

Aspect 13 is the apparatus of any of aspects 1-12, wherein the reservation is for blanking the set of time-domain resources and the set of frequency-domain resources around the WUS to avoid power leakage from adjacent RBs.

Aspect 14 is the apparatus of any of aspects 1-13, further including a transceiver.

Aspect 15 is an apparatus for wireless communication at a relaying UE or a base station, including: a memory; and at least one processor coupled to the memory and configured to: receive, from a low-power UE, a UE capability report indicating at least RF capability associated with the low-power UE; transmit, to one or more UEs, a reservation reserving a set of time-domain resources and a set of frequency domain resources around a WUS for the low-power UE; and transmit the WUS to the low-power UE.

Aspect 16 is the apparatus of aspect 15, wherein the set of time domain resources is represented by a bitmap in the reservation.

Aspect 17 is the apparatus of any of aspects 15-16, wherein the bitmap includes one or more PI, each PI including X number of bits, X being a positive integer, each bit representing one symbol.

Aspect 18 is the apparatus of any of aspects 15-16, wherein the bitmap includes one or more bits, each bit of the one or more bits representing X symbols, X being an integer greater than or equal to one.

Aspect 19 is the apparatus of any of aspects 15-16, wherein the set of time domain resources is represented by a starting symbol and one or more reserved symbol numbers representing reserved symbols.

Aspect 20 is the apparatus of any of aspects 15-19, wherein the set of frequency domain resources includes an active BWP associated with the WUS.

Aspect 21 is the apparatus of any of aspects 15-19, wherein the set of frequency domain resources includes one or more sub-bands in an active BWP associated with the WUS, and the one or more sub-bands represented by a bitmap in the reservation.

Aspect 22 is the apparatus of any of aspects 15-21, wherein the reservation reserves a defined set of resources associated with the WUS.

Aspect 23 is the apparatus of any of aspects 15-22, wherein the defined set of resources includes a defined symbol of a slot associated with the WUS.

Aspect 24 is the apparatus of any of aspects 15-23, wherein the reservation labels the reserved resources as not recommended, and wherein the at least one processor is further configured to: receive in the reserved resources.

Aspect 25 is the apparatus of any of aspects 15-24, wherein the reservation is transmitted via a PSCCH.

Aspect 26 is the apparatus of any of aspects 15-25, wherein the reservation is transmitted via a PDCCH.

Aspect 27 is the apparatus of any of aspects 15-26, wherein the reservation is for blanking the set of time-domain resources and the set of frequency-domain resources around the WUS to avoid power leakage from adjacent RBs.

Aspect 28 is the apparatus of any of aspects 15-27, further including a transceiver.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a user equipment (UE), comprising:

a memory; and at least one processor coupled to the memory and configured to:

receive, from a base station or a second UE, a reservation reserving a set of time-domain resources within a threshold time distance of a wakeup signal (WUS) for a low-power UE and a set of frequency domain resources around within a threshold frequency distance of the wakeup signal (WUS), wherein the reservation is for blanking the set of time-domain resources and the set of frequency-domain resources around the WUS to avoid power leakage from adjacent resource blocks (RBs); and refrain from transmitting in the reserved resources.

2. The apparatus of claim 1, wherein the set of time domain resources is represented by a bitmap in the reservation.

3. The apparatus of claim 2, wherein the bitmap comprises one or more pre-emption indication (PI), each PI comprising X number of bits, X being a positive integer, each bit representing one symbol.

4. The apparatus of claim 2, wherein the bitmap comprises one or more bits, each bit of the one or more bits representing X symbols, X being an integer greater than or equal to one.

5. The apparatus of claim 1, wherein the set of time domain resources is represented by a starting symbol and one or more reserved symbol numbers representing reserved symbols.

6. The apparatus of claim 1, wherein the set of frequency domain resources comprises an active bandwidth part (BWP) associated with the WUS.

7. The apparatus of claim 1, wherein the set of frequency domain resources comprises one or more sub-bands in an active bandwidth part (BWP) associated with the WUS, and the one or more sub-bands represented by a bitmap in the reservation.

8. The apparatus of claim 1, wherein the reservation reserves a defined set of resources associated with the WUS.

9. The apparatus of claim 8, wherein the defined set of resources comprises one or more defined symbols of a slot associated with the WUS.

10. The apparatus of claim 1, wherein the reservation labels the reserved resources as not recommended, and wherein the at least one processor is further configured to:

transmit in the reserved resources.

11. The apparatus of claim 1, wherein the reservation is received from the second UE via a physical sidelink control channel (PSCCH).

12. The apparatus of claim 1, wherein the reservation is received from the base station via a physical downlink control channel (PDCCH).

13. The apparatus of claim 1, further comprising a transceiver.

14. An apparatus for wireless communication at a relaying user equipment (UE) or a base station, comprising:

a memory; and at least one processor coupled to the memory and configured to:

receive, from a low-power UE, a UE capability report indicating at least radio frequency (RF) capability associated with the low-power UE;

transmit, to one or more UEs, a reservation reserving a set of time-domain resources within a threshold time distance of a wakeup signal (WUS) for a low-power UE and a set of frequency domain resources within a threshold frequency distance of the wakeup signal (WUS), wherein the reservation is for blanking the set of time-domain resources and the set of frequency-domain resources around the WUS to avoid power leakage from adjacent resource blocks (RBs); and transmit the WUS to the low-power UE.

15. The apparatus of claim 14, wherein the set of time domain resources is represented by a bitmap in the reservation.

16. The apparatus of claim 15, wherein the bitmap comprises one or more pre-emption indication (PI), each PI comprising X number of bits, X being a positive integer, each bit representing one symbol.

17. The apparatus of claim 15, wherein the bitmap comprises one or more bits, each bit of the one or more bits representing X symbols, X being an integer greater than or equal to one.

18. The apparatus of claim 14, wherein the set of time domain resources is represented by a starting symbol and one or more reserved symbol numbers representing reserved symbols.

19. The apparatus of claim 14, wherein the set of frequency domain resources comprises an active bandwidth part (BWP) associated with the WUS.

20. The apparatus of claim 14, wherein the set of frequency domain resources comprises one or more sub-bands in an active bandwidth part (BWP) associated with the WUS, and the one or more sub-bands represented by a bitmap in the reservation.

21. The apparatus of claim 14, wherein the reservation reserves a defined set of resources associated with the WUS.

22. The apparatus of claim 21, wherein the defined set of resources comprises one or more defined symbols of a slot associated with the WUS.

23. The apparatus of claim 14, wherein the reservation labels the reserved resources as not recommended, and wherein the at least one processor is further configured to:

receive in the reserved resources.

24. The apparatus of claim 14, wherein the reservation is transmitted via a physical sidelink control channel (PSCCH).

25. The apparatus of claim 14, wherein the reservation is transmitted via a physical downlink control channel (PDCCH).

26. The apparatus of claim 14, further comprising a transceiver.

27. A method of wireless communication at a user equipment (UE), comprising:

receiving, from a base station or a second UE, a reservation reserving a set of time-domain resources within a threshold time distance of a wakeup signal (WUS) for a low-power UE and a set of frequency domain resources within a threshold frequency distance of the wakeup signal (WUS), wherein the reservation is for blanking the set of time-domain resources and the set of frequency-domain resources around the WUS to avoid power leakage from adjacent resource blocks (RBs); and refraining from transmitting in the reserved resources.

28. A method of wireless communication at a base station, comprising:

receiving, from a low-power UE, a UE capability report indicating at least radio frequency (RF) capability associated with the low-power UE;

transmitting, to one or more UEs, a reservation reserving a set of time-domain resources within a threshold time distance of a wakeup signal (WUS) for a low-power UE and a set of frequency domain resources within a threshold frequency distance of the wakeup signal (WUS), wherein the reservation is for blanking the set of time-domain resources and the set of frequency-domain resources around the WUS to avoid power leakage from adjacent resource blocks (RBs); and transmitting the WUS to the low-power UE.

* * * * *